United States Patent
Werner et al.

(10) Patent No.: US 7,373,235 B2
(45) Date of Patent: May 13, 2008

(54) METHOD AND SYSTEM FOR CONTROL OF AN AUTOMATIC FRICTION CLUTCH ARRANGED BETWEEN AN ENGINE AND A GEARBOX ON A MOTOR VEHICLE

(75) Inventors: Olaf Werner, Buehl (DE); Roland Seebacher, Neuried-Ichenheim (DE); Klaus Kuepper, Buehl (DE); Carsten Mohr, Buehlertal (DE); Severine Gallou, Saint-Arnoult (FR)

(73) Assignee: Luk Lamellen und Kupplungsbau Beteiligungs KG, Buehl (DE)

( * ) Notice: Subject to any disclaimer, the term of this patent is extended or adjusted under 35 U.S.C. 154(b) by 725 days.

(21) Appl. No.: 10/487,636

(22) PCT Filed: Aug. 17, 2002

(86) PCT No.: PCT/DE02/03019

§ 371 (c)(1),
(2), (4) Date: Feb. 24, 2004

(87) PCT Pub. No.: WO03/019029

PCT Pub. Date: Mar. 6, 2003

(65) Prior Publication Data
US 2004/0210374 A1    Oct. 21, 2004

(30) Foreign Application Priority Data
Aug. 24, 2001  (DE) ................................ 101 41 612
Nov. 19, 2001  (DE) ................................ 101 56 787
Apr. 10, 2002  (DE) ................................ 102 15 715

(51) Int. Cl.
G06F 7/00      (2006.01)
G06F 17/00     (2006.01)
G06F 19/00     (2006.01)

(52) U.S. Cl. .......................................... 701/67; 701/68
(58) Field of Classification Search .................. 74/377; 477/176; 701/67–68
See application file for complete search history.

(56) References Cited

U.S. PATENT DOCUMENTS

| | | |
|---|---|---|
| 5,322,150 A | 6/1994 | Schmidt-Bruecken et al. ... 477/176 |
| 5,403,250 A | 4/1995 | Juergens ..................... 477/176 |

FOREIGN PATENT DOCUMENTS

DE    4100372    7/1992

(Continued)

OTHER PUBLICATIONS

Design of robust vehicle launch control system, Slicker, J.M.; Loh, R.N.K.; Control Systems Technology, IEEE Transactions on vol. 4, Issue 4, Jul. 1996 pp. 326-335, Digital Object Identifier 10.1109/87.508881.*

(Continued)

*Primary Examiner*—Cuong Nguyen
(74) *Attorney, Agent, or Firm*—Davidson, Davidson & Kappel

(57) ABSTRACT

An automatic friction clutch, contained in the drive train of a motor vehicle is controlled such that a preset clutch torque can be transmitted. The preset clutch torque is composed of a pilot clutch torque M and a clutch torque Msr, which is dependent on slip.

14 Claims, 10 Drawing Sheets

FOREIGN PATENT DOCUMENTS

DE   4241995    6/1994
DE   19751455   5/1999

OTHER PUBLICATIONS

Diameter sizing of rolls in bridles that utilize powder clutches, Boulter, B.T.; Lockhart, R.F.; Industry Applications, IEEE Transactions on, vol. 33, Issue 3, May-Jun. 1997 pp. 797-800, Digital Object Identifier 10.1109/28.585872.*

Mechanical components for handling magnetic recording tape, Bixler, O.; Audio, Transactions of the IRE Professional Group on vol. 2, Issue 1, Part 1, Jan. 1954 pp. 15-23.*

* cited by examiner

METHOD AND SYSTEM FOR CONTROL OF AN AUTOMATIC FRICTION CLUTCH ARRANGED BETWEEN AN ENGINE AND A GEARBOX ON A MOTOR VEHICLE

The present invention relates to a method and a system for controlling an automated friction clutch situated between an engine and a transmission of a motor vehicle.

A peculiar feature of piston combustion engines is that the torque loading on the crankshaft becomes increasingly irregular as the number of cylinders and the rotational speed decrease. This has a negative effect on driving comfort. An effective possibility for reducing vibrations caused by rotational inconsistencies is presented by the dual mass flywheel, which however entails additional expense compared to a single-mass flywheel and requires a certain amount of mounting space.

In recent times, the use of automated friction clutches that enable improvement in operating comfort and allow the use of economically favorable automated manual transmissions has become more widespread.

DE 41 90 372 proposes a method for controlling such an automated friction clutch in such a way that it may be adjusted or regulated to a slip having a predetermined magnitude in order to decrease torsional vibrations. For this purpose a clutch torque computation device is provided that computes a clutch torque to be transferred based on engine torque and in some instances further operating parameters of the vehicle's drive train and determines from this a control signal for actuating a controller of the clutch. A set point slip computation device is further provided, in which a setpoint slip of the clutch is stored as a function of the operating state variables of the drive train. This setpoint slip is compared with an actual slip of the clutch. An additional control signal for the clutch controller is derived from this comparison in a PID controller, the control signal being superimposed by the control signal dependent on the clutch torque to be transferred. To improve control quality, the integral part of the PID controller is used together with additional operating state variables to modify the torque to be transferred by the clutch.

An object of the present invention is to provide a method and a system for controlling an automated friction clutch situated between an engine and a transmission of a motor vehicle that enables a reduction in the torsional vibrations caused by the engine of the motor vehicle while satisfying to the extent possible the requirements for practical use.

The present invention provides a method for controlling an automated friction clutch situated between an engine and a transmission of a motor vehicle, according to which method operating state variables of the drive train are detected and the clutch is controlled in such a way that it transfers a clutch torque that is made up of an essentially engine torque-dependent component and a slip-dependent component, the component that is engine torque-dependent being computed according to operating state variables of the drive train and being adapted according to an i-component of a controller, and the slip-dependent component being determined by the controller based on a variance between an actual slip and a setpoint slip determined from operating state variables of the drive train. The parameters of the controller are computed from operating state variables of the drive train, and are corrected, and the engine torque-dependent component of the clutch torque is adapted by the i-component of the controller in the sense of a reduction of the integral component. Since parameters of the controller are computed from the operating state variables of the drive train and subsequently corrected and/or adapted, excellent control quality is achieved that allows the slip of the clutch necessary for smooth operation to be precisely controlled.

In a variation of the method, the component of the clutch torque that is essentially engine torque-dependent and the slip-dependent component of the clutch torque may be computed solely from the operating state variables of the drive train as a function of the operating state variables of the drive train, thereby bypassing the controller and the adaptation. As a consequence, in certain operating states, for example at very high rotational speeds, a transition may be made from slip-controlled operation of the clutch to an operation in which the controller is inoperative.

In a further variation of the method, the component of the clutch torque that is essentially engine torque-dependent may be determined, during rapid changing of the position of a load control element, mainly from the position of the load control element and the rotational speed of the propulsion engine, and during slow changing of the position of the load control element from additional engine operating variables. In this way, the control quality may be further improved since the position of the load control element and the rotational speed of the propulsion engine are available instantaneously during rapid changes, while additional operating variables are made available for consideration, for example via a bus system, only after a time delay.

According to a further inventive idea, the control quality may be improved in a variation of the method according to which the i-component effective for adaptation may be corrected during changes of the engine torque in accordance with the ratio of engine torque change to the variable value of the engine torque since the controller is not required to compensate for incorrect controlling arising during a change in the engine torque because the false control is instantaneously corrected.

For the intended configuration of the controller, the parameters of the controller may be determined as a function of at least one of the following operating state variables: engine torque, clutch torque, rotational speed fluctuation, rotational speed, gear. The setpoint slip speed and the controller characteristic curves are modified on the basis of at least one of the following driving states: Tip-in, back-out, rapidly decreasing setpoint slip variance, prolonged negative setpoint slip variance, creeping, controller instabilities, zero crossing.

The controller and precontrolling via the characteristic map may be optimally adjusted for any driving state by using a characteristic map that indicates speed fluctuations as a function of the static engine torque and the rotational speed to adapt the component of the clutch torque that is essentially engine torque-dependent and/or the controller.

With a slow change of the setpoint slip during changing of the operating variables of the drive train and short-term increasing of the setpoint slip in the case of interferences such as changing gears, zero crossing, tip-in, or back-out, it is possible to prevent jumps during driving state changes, thereby stabilizing the controller.

In the event of existing controller instabilities, instantaneous response is possible if at least one of the following steps is performed within a predefined time interval after setpoint slip crossings, or threshold value overruns of setpoint slip variances have occurred, or other controller instabilities have been detected a specified number of times:

Changing of a controller parameter;
    Switching to a different controller configuration;
    Reducing the setpoint slip speed;
    Switching off the slip control.

A method according to which a setpoint slip of the clutch is not computed but is determined via measurement and control may also be advantageous. This method for controlling an automated friction clutch situated between an engine and a transmission of a motor vehicle according to which an interference variable dependent on the slip of the clutch is detected and an actuator actuating the clutch may be controlled in such a way may provide that the clutch transfers a clutch torque computed from operating variables of the drive train and is disengaged on the basis of the interference variable in such a way that the interference variable remains below a predefined threshold value.

Moreover, the present invention provides a system for controlling an automated friction clutch situated between an engine and a transmission of a motor vehicle, including an actuator that sets the clutch to a position defined by a position signal on the basis of the position signal; a clutch torque computation device that computes an engine torque-dependent component of the setpoint clutch torque and a clutch slip-dependent component of the setpoint clutch torque from an engine torque and additional operating state variables of the drive train of the vehicle including the engine, the clutch, and the transmission; a position signal computation device that determines the position signal supplied to the actuator from the two components of the setpoint clutch torque and a stored assignment between the setpoint clutch torque and the position signal; a slip control switch that separates the direct connections between the clutch torque computation device and the position signal computation device in a slip control position and connects a signal path containing the engine torque-dependent component of the clutch torque via an adaptive precontrol unit to the corresponding input of the position signal computation unit, and connects the signal path containing the slip-dependent component of the clutch torque to the corresponding input of the position signal computation unit via a controller, a signal corresponding to the actual slip and a signal corresponding to a setpoint slip and computed in a setpoint slip computation device being present at additional inputs of the controller. The system according to the present invention enables switching to slip-controlled operation from conventional operation of an automatic clutch in which the clutch actuator is controlled according to a clutch torque which is engine torque-dependent and a slip-dependent clutch torque using the slip control switch in which torsional vibrations of the engine may be reduced in a targeted manner. As a result, the vehicle may be driven deliberately in a non-slip-controlled manner in certain operating phases in which non-slip-controlled operation may be more practical, for example during gear change or at start-up or at very high rotational speeds, whereas the vehicle is driven in a slip-controlled manner in other operating phases and the torsional vibrations of the engine may be reduced accordingly.

The present invention also provides a system for controlling an automated friction clutch situated between an engine and a transmission of a motor vehicle, including an actuator for setting the clutch to a position defined by a position signal on the basis of the position signal; a clutch torque computation device that computes an engine torque-dependent component of a setpoint clutch torque and a clutch slip-dependent component of the setpoint clutch torque from an engine torque and additional operating state variables of the drive train of the vehicle including the engine, the clutch, and the transmission; a position signal computation device that determines the position signal supplied to the actuator from the two components of the setpoint clutch torque of a stored assignment between the setpoint clutch torque and the position signal; one output of the clutch torque computation unit that supplies a signal corresponding to the engine torque-dependent component of the clutch torque being connected via an adaptive precontrol unit to the corresponding input of the position signal computation unit; and one output that supplies a signal corresponding to the slip-dependent component of the clutch torque being connected to a parameterisation input of a controller via a controller configuration unit for detecting at least one operating state variable of the drive train, a signal corresponding to the actual slip and a signal corresponding to a setpoint slip and computed in a setpoint slip computation device being present at the controller's additional inputs, and the controller's output being connected to the input of the position signal computation unit assigned to the slip-dependent component of the clutch torque. The controller configuration unit that detects various operating state variables of the drive train and derives parameters therefrom for controlling the characteristics of the controller ensures that the control response of the controller may be adjusted optimally to a wide range of circumstances.

BRIEF DESCRIPTION OF THE DRAWINGS

The present invention is explained in greater detail in the following by way of example and based upon schematic drawings.

Before proceeding to a detailed description of the present invention with reference to the figures, it should be noted that the speed differential at the clutch that is to isolate the engine vibration excitations from the rest of the vehicle must be set relatively precisely.

Excessive speed differential results in increased energy input and clutch wear; insufficient speed differential may cause the clutch to stick and thus results in insufficient comfort improvement (rattle>300 Hz). In addition, fluctuations in the speed differential are transferred to the vehicle and may be perceived as low-frequency translatory vibrations (<3 Hz) by the vehicle occupants. A slip-controlled clutch for isolating torsional fluctuations therefore requires optimal adjustment of the controller.

Figure 1:
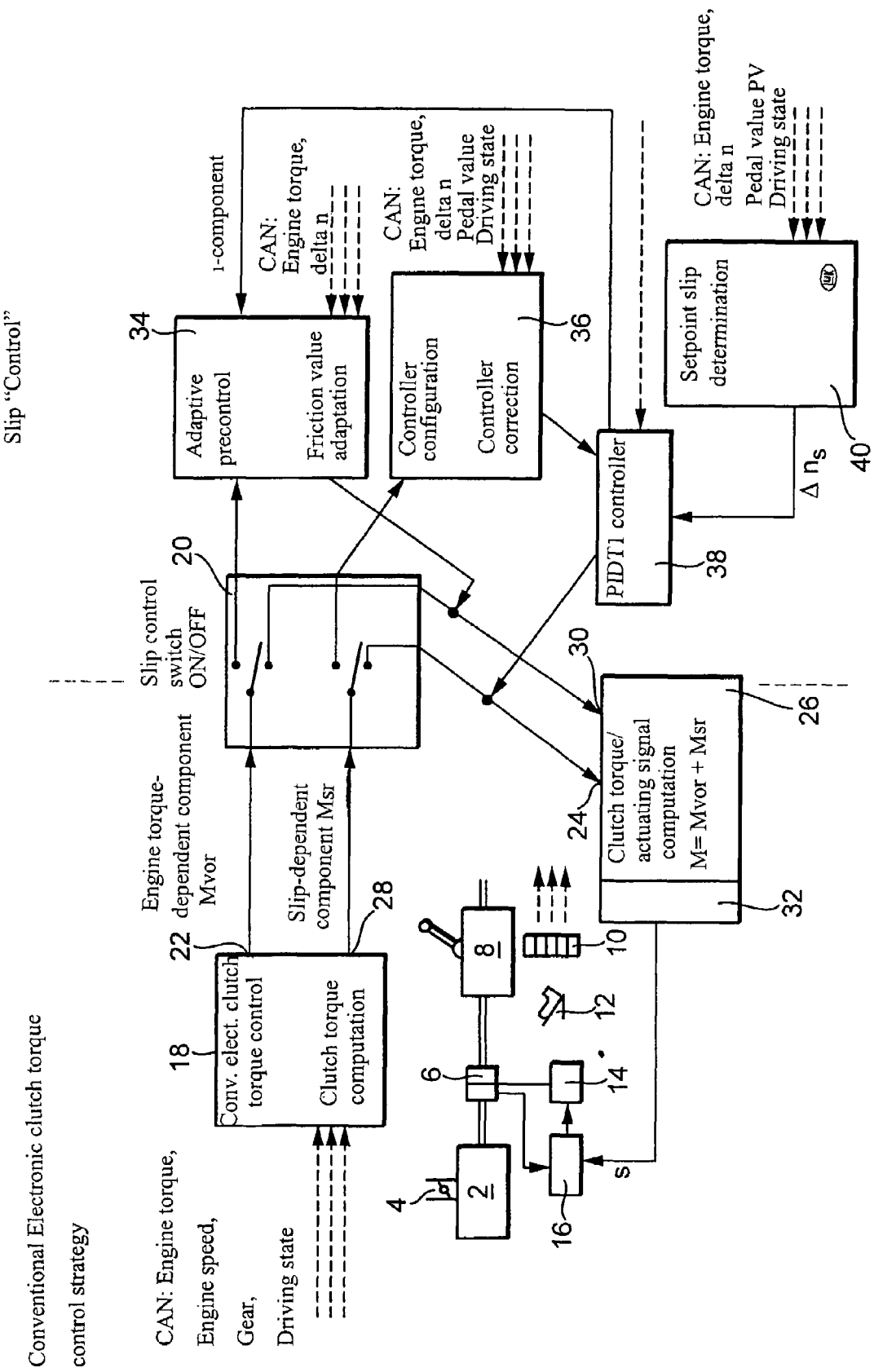
FIG. 1 shows a block diagram of a drive train having basic functional blocks of the system according to the present invention and their interaction.

FIG. 1 shows a simplified schematic representation of a vehicle drive train with the basic structure of the system according to the present invention.

A drive train of a motor vehicle has a propulsion engine 2 having a load control element 4. Propulsion engine 2 is connected to a transmission 8 via an automated clutch 6, for example a friction-disk clutch having a single-mass flywheel and a torsional vibration-dampened clutch disc. Sensors 10, which detect for example the engine speed, the position of gas pedal 12, the rotational speed of the transmission input shaft, the position of the transmission selector lever etc., are connected to an electronic control unit in which characteristic curves and characteristic maps as well as algorithms are stored in a manner known per se and which are used as a basis for controlling the clutch and in some instances the engine and the transmission depending on the performance desired by the driver and other conditions. An actuator 14 is used for operating clutch 6 and is controlled by an adjusting controller 16 in such a way that the clutch position corresponds with a position signal s that is supplied to adjusting controller 16.

The following first explains a conventional system for controlling clutch 6 and its mode of operation (left half of FIG. 1; conventional ECM (electronic clutch management)):

The signals detected by sensors 10, for example the engine torque, the engaged gear, the driving state of the vehicle (accelerating, breaking, gear change, crawl speed), the clutch input speed, and the clutch output speed, are supplied via a bus system, for example a CAN bus, to a clutch torque computation device 18, in which the respective torque to be transferred by the clutch is computed. For reasons of fuel consumption, control quality, wear, etc, this torque must be no higher than absolutely necessary. It is practical to divide clutch torque M into two components, a component Mvor, which is dependent only on the instantaneous engine torque and is a precontrol component, and a slip-dependent component Msr, which is superimposed on the engine torque-dependent component Mvor corresponding to the particular driving states, for example start-up, gear change, etc., and is important for driving comfort. Both components are stored in characteristic maps in clutch torque computation device 18 and are read out corresponding to the operating state variables of the drive train that are detected by the sensors.

A slip control switch having reference numeral 20 is not provided in a conventional clutch control system so that there exists a functional state in which engine torque-dependent component Mvor of the clutch torque present at output 22 is supplied directly to an input 24 of a position signal computation unit 26 and the slip-dependent clutch torque signal present at output 28 of clutch torque computation device 18 is supplied to an input 30 of position computation device 26. The two signals Mvor and Msr are combined or added in position signal computation device 26 to yield total torque M applied by clutch 6 and are converted in a memory 32 of position signal computation unit 26 into a position signal s, which corresponds with the position in which clutch 6 transfers the computed torque M. Of course, if there is no slip control switch 20, setpoint clutch torque M may be computed directly in unit 18 and converted in a memory to a corresponding clutch setpoint position. The described system is used overall to precontrol the transferable clutch torque on the basis of Mvor and to modulate the transferable clutch torque on the basis of Msr, so that slip is determined as a function of variables describing the driving state.

According to the present invention, slip control switch 20 is provided and in its top position according to FIG. 1 allows variable further processing of the engine torque-dependent component of clutch torque Mvor and of the slip-dependent component of clutch torque Msr. It is apparent that signal Mvor is supplied to an adaptive precontrol unit 34, whose output is connected to input 30 of position signal computation unit 26. Slip-dependent clutch torque Msr is supplied to a controller configuration unit 36, in which parameters are computed that determine the control response of a PIDT1 controller 38, whose output is connected to input 24 of position signal computation unit 26. One input of controller 38 is connected to a setpoint slip computation unit 40, in which a setpoint slip $\Delta$ns is computed depending on operating state variables such as engine torque, actual slip $\Delta$ni, pedal position, etc., supplied via the CAN bus. A signal corresponding to actual slip $\Delta$ni of clutch 6 is applied to a further input of controller 38. The integral component (i-component) of controller 38 is supplied to one input of adaptive precontrol unit 34. Further inputs of adaptive precontrol unit 34 and controller configuration unit 36 are connected to the bus system via which they all receive operating state variables of the drive train. The term operating state variables refers to constantly changeable variables of the drive train that are detected by sensors, such as rotational speeds, positions, etc. Driving states are defined states, such as vehicle idling, gear change, start-up, etc.

By switching slip control switch 20, it is possible to switch from the conventional clutch control strategy, in which units 18 and 26 are directly connected, to a slip control strategy. The precomputed engine torque-dependent component of clutch torque Mvor is modified in adaptive precontrol unit 34 on the basis of the i-component of PIDT1 controller 38 and operating state variables, which may also include instantaneous slip $\Delta$ni, and if necessary may be adapted to the friction value of the clutch and supplied as adaptive precontrol signal Mvor to input 30. Precomputed slip-dependent component Msr is used together with operating state variables, which also include the actual slip of the clutch, in controller configuration unit 36 for the purpose of computing parameters of PIDT1 controller 38. Slip-dependent engine torque Msr, which is computed by controller 38 and is supplied to input 24 of position signal computation unit 26, supersedes precomputed slip-dependent component Msr of the engine torque. According to the block diagram in FIG. 1, the setpoint slip is determined from operating state variables of the drive train. Alternatively and/or additionally, the setpoint slip may be determined diagnostically by providing, for example, a sensor for detecting transmission rattle or a sensor for detecting torsional vibrations and the setpoint slip in each case is determined in such a way that the transmission rattle and/or torsional vibrations remain below predetermined threshold values.

As is evident from the preceding, slip control switch 20 activates three functional blocks in total; a control (blocks 36 and 38), a setpoint slip determination (block 40), and a precontrol (block 34). The adaptive precontrol ensures that the clutch torque is precontrolled as precisely as possible so that controller 38, the behavior of which is modified according to state, is able to adjust only minimal variances quickly and precisely.

Figure 2:
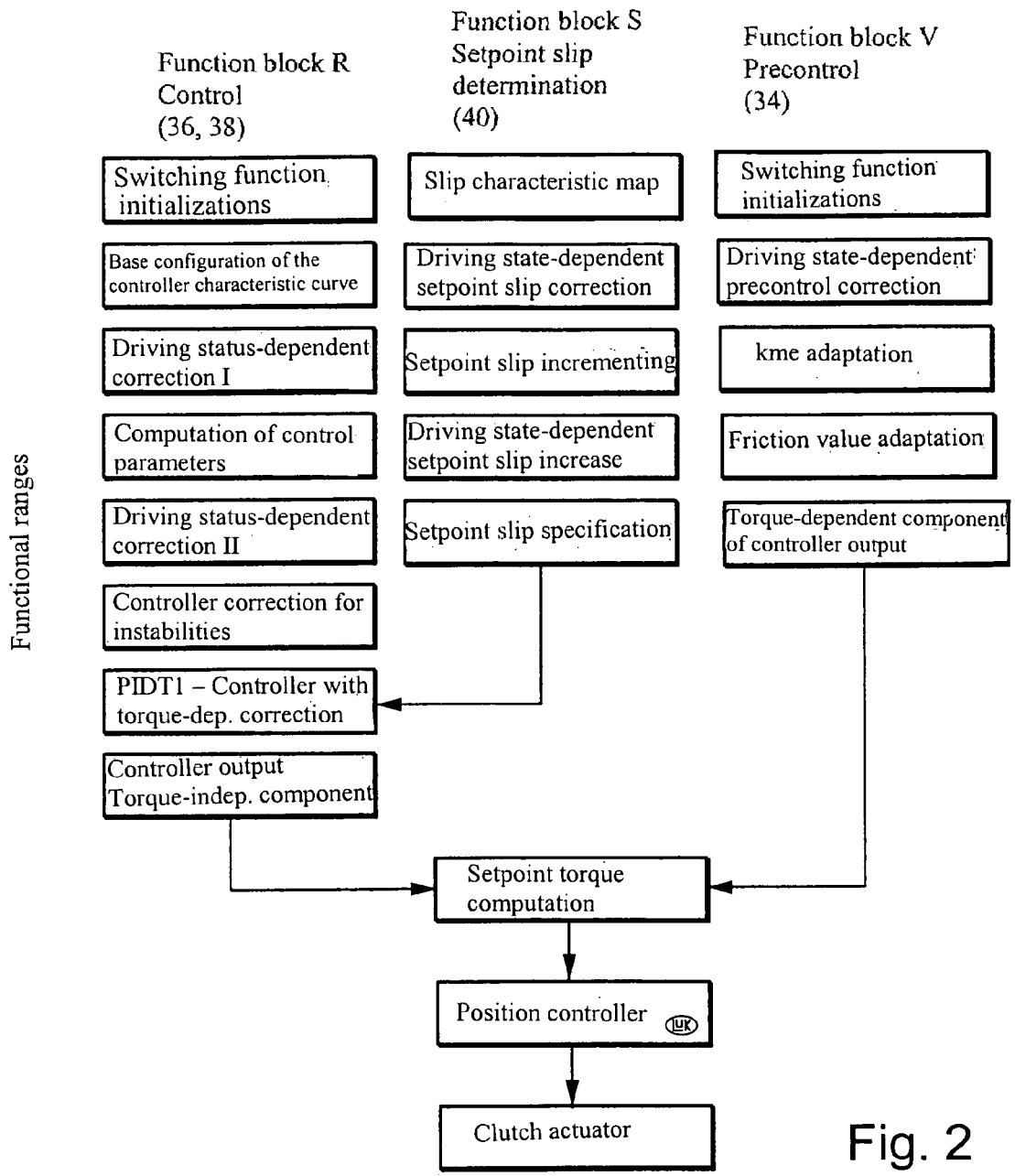
FIG. 2 shows the functional scope and interaction of the functional blocks in FIG. 1.

FIG. 2 illustrates the ranges contained in the functional blocks and their interaction.

Control

Switching slip control switch 20 causes the initializations in accordance with the switching functions. Subsequently the base configuration of the controller characteristic curve takes place, followed by a first driving state-dependent correction, whereupon the control parameters are computed. After this, a further driving state-dependent controller correction and in some instances a further correction for instabilities are performed so that the behavior of PIDT1 controller 38 is specified according to the most current data.

Setpoint Slip Determination

The setpoint slip characteristic map stored in unit 40 is corrected with reference to the driving state. Following incrementation and possible driving state-dependent increase of the setpoint slip, the setpoint slip specification is provided to an input of controller 38. The controller generates the slip-dependent component of the engine torque at its output, which is then supplied to unit 26.

Precontrol

After the initialization subsequent to switching, a correction is performed on the basis of the driving state or the operating state variables of the drive train, whereupon a weighting factor of the engine torque-dependent component of the clutch torque (kme) is adapted, followed by an adaptation corresponding to the friction value of the clutch, and the engine torque-dependent component of the clutch torque thus adapted is supplied to input 24 of position signal computation unit 26. Position signal s, which is determined there by addition of the two components of the engine torque and corresponds to the determined engine torque, is supplied to controller 16 from where actuator 14 is controlled correspondingly so that the clutch transfers the predetermined torque.

Figure 3:
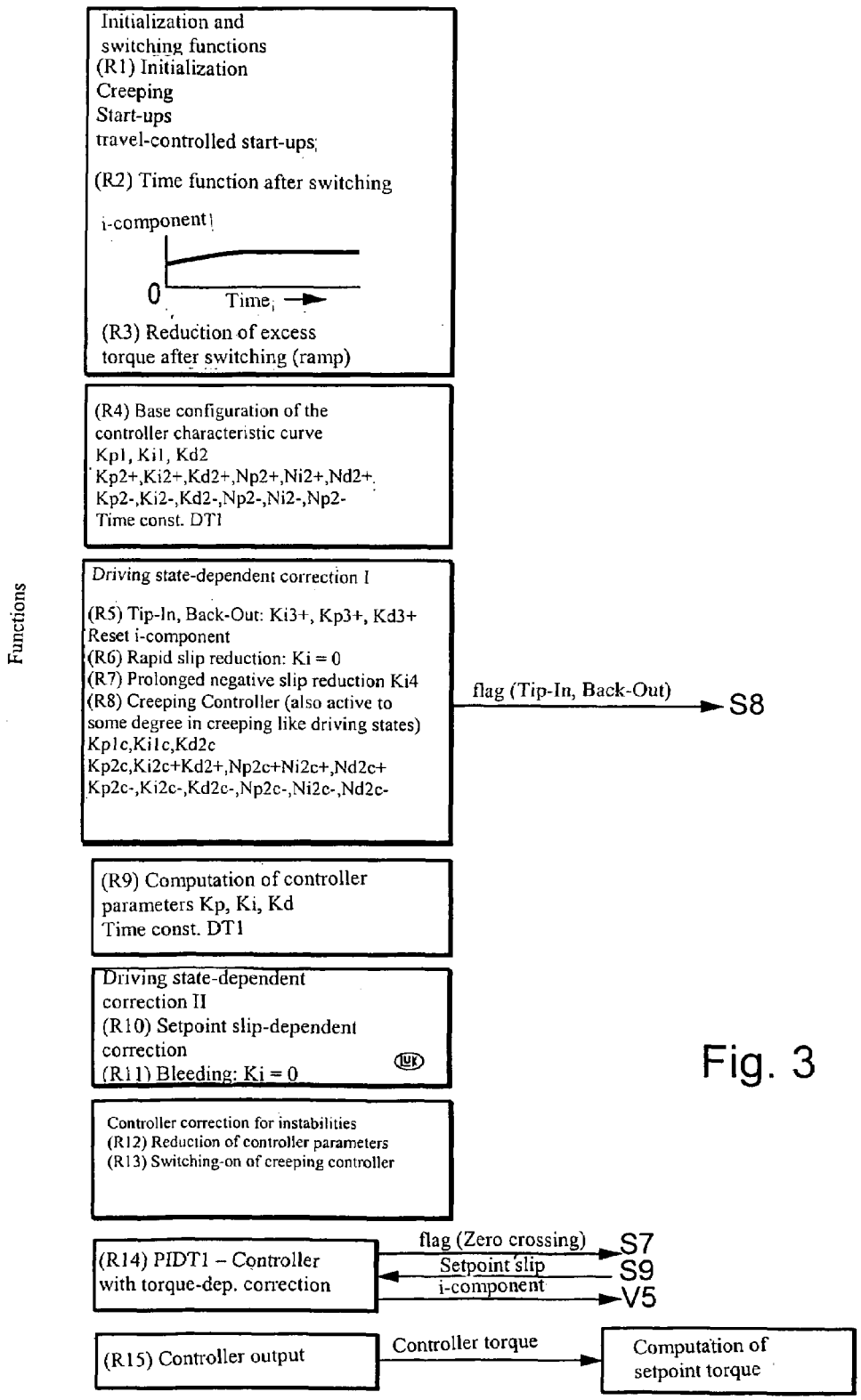
FIG. 3 shows a detailed representation of the "control" function block.
Figure 4:
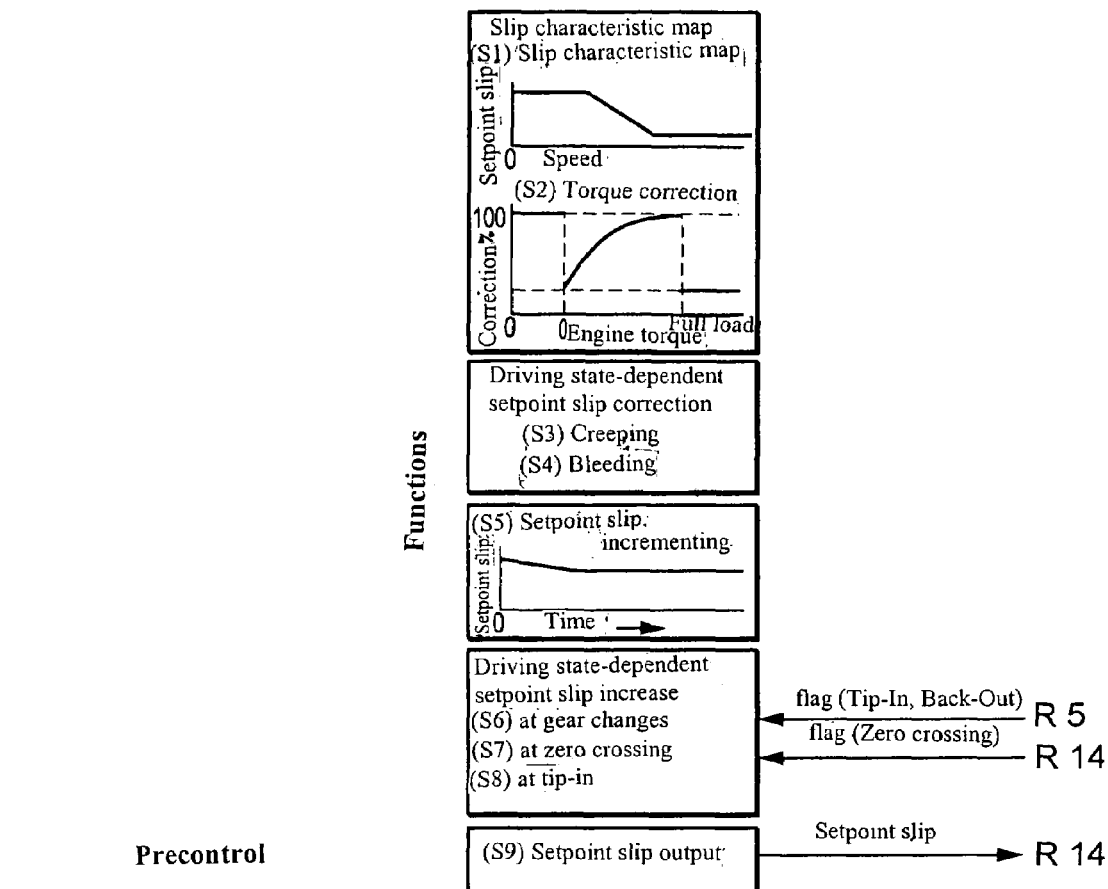
FIG. 4 shows a detailed representation of the "desired slip determination" functional block.
Figure 5:
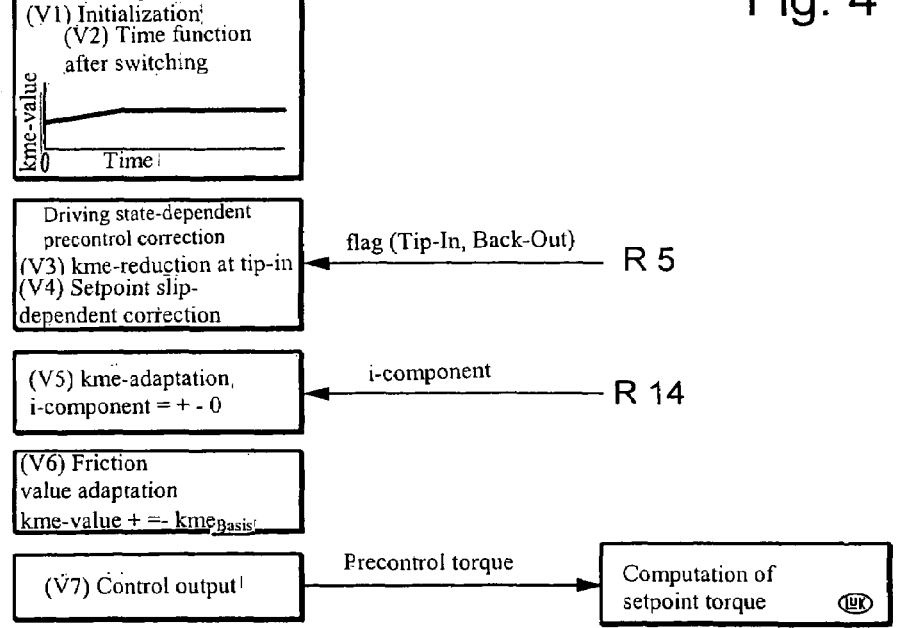
FIG. 5 shows a detailed representation of the "precontrol" functional block.

The individual functions are explained in the following with reference to the figures. FIGS. 3 through 5 show in more detail the functional ranges included in the individual functional blocks of FIG. 2.

1. Operation of Slip Control Switch 20 (Switching to Slip Operation)

Slip control switch 20 may be switched to slip control in various ways, for example, at the presence of certain driving states to which appropriate state flags are assigned by the software, depending on operating state variables of the drive train (e.g., rotational speeds and torques) or at a predetermined variance between the detected actual slip and a setpoint slip stored in clutch torque computation device 18.

Switching to slip-controlled operation takes place preferably in two steps. In the first step, the engine torque-dependent (slip-independent) clutch torque component is transferred to precontrol 34 by fixing the current kme value (V1 in FIG. 5). PIDT1 controller 38 is activated at the same time. The i-component of the controller is initialized via the slip-dependent component of engine torque Msr computed in clutch torque computation device 18 (R1 in FIG. 3). In the event that the travel control has engaged with the start-up strategy prior to switching, this is taken into account during initialization. In a second step, the kme value is changed over a period of time (V2 in FIG. 5) to an optimal value. At the same time, the slip-dependent component (i-component of the controller) is changed in an inversely equalizing manner (R1 in FIG. 3) to prevent control variances. During the ramp, computational inaccuracies are compensated by the controller. In this context, travel control refers to the control of the clutch via a travel sensor on the clutch or an element allowing a conclusion regarding the state of engagement or disengagement. Travel control may be viewed in this context as a substitute function for torque control when the torque control is not successful in reducing the desired slip.

Of course, single-step switching is also entirely possible.

An additional function (R3 in FIG. 3) that quickly reduces the peak torque at the switching end to prevent extended sticking phases of the clutch is available during switches to control operation following gear changes. The peak torque, which is increased during switching via the slip-dependent torque component, is reduced after activation of the slip control by a corresponding reduction of the i-component.

2. Gaussian Error Integral

Figure 6:
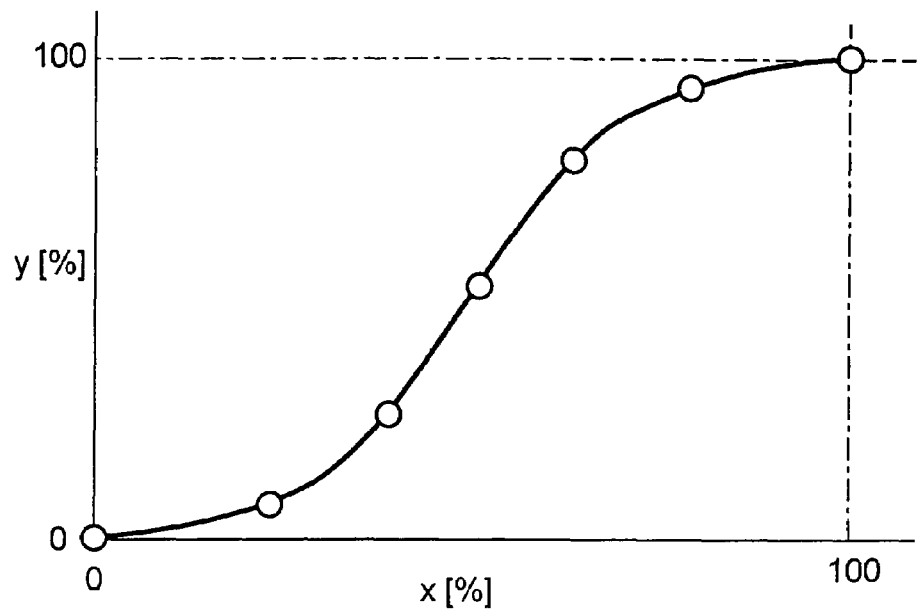
FIG. 6 shows a curve representing a Gaussian error integral stored in normalized manner as a data point function.

It is advantageous for different functions of the slip control to use a function in accordance with the Gaussian error integral (jump function), as shown in FIG. 6, to implement a control that is as constant as possible. The function is stored in a standardized manner in the software and is used for example to describe the controller characteristic curve (functions R4 through R9 in FIG. 3). It may also be used in functions R10 (FIG. 3) and V4 (FIG. 5).

3. Controller Functions

The core of the controller is a PIDT1 characteristic curve controller having a time constant selected to be very small to prevent an unfavorable phase of the differential component relative to the proportional component. Each characteristic curve depends on the driving state or the operating state variables of the drive train. The three controller parameters Kp, Ki, Kd are determined in five steps. The driving state-dependent corrections are basically differentiated before (R5 through F8) and after (R10 through R13) the characteristic curve computation (R9) (see FIG. 3).

A gear-dependent configuration of the controller, the precontrol, and the setpoint slip is advantageous. The following representation relates to one gear only.

3.1 Switching (R1, R2: See Previous Chapter 1)

3.2 Base Configuration of the Controller Characteristic Curve (R4)

Figure 7:
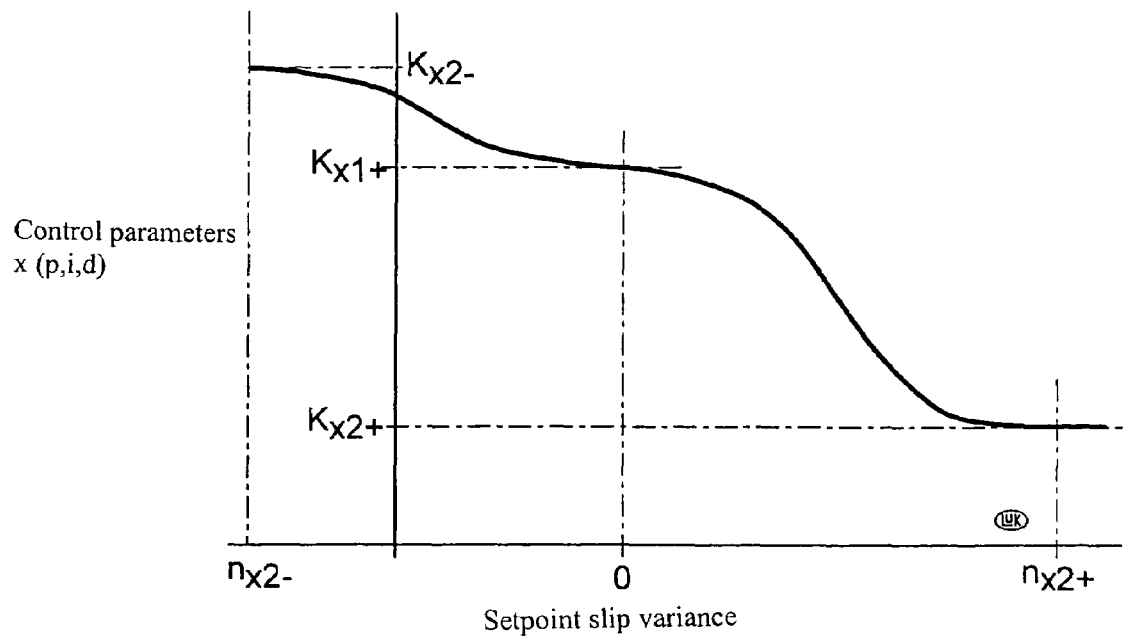
FIG. 7 shows a curve illustrating the basic configuration of the controller.

FIG. 7 shows the theoretical characteristic curve of a control parameter over the setpoint slip variance. The Gaussian error integral was used to describe the characteristic curve. The functional relationship represented is made up of two functions. The positive branch is determined for each controller component by two controller constants and one speed constant (setpoint slip variance). In the negative branch, one controller constant and one speed constant are added. Together with the time constant, this makes for 16 constants in all for the entire controller. For the sake of simplification, the speed constants are considered to be equal for the P, i, and D components, thereby reducing the number of constants to 12.

Raising the characteristic curve in the negative range serves to reduce sticking phases of the clutch. Lowering in the positive range serves both to synchronize load shifting and also to stabilize the controller, which allows "firm" synchronization in the range of the actual slip. As a result of this synchronization, the setpoint slip may be very well maintained during smaller interferences. In the case of more significant load shifts, the synchronization is gentler to prevent over-oscillation of the controller. Given optimal precontrol, transmission rattle may be prevented and load shifting may be synchronized for smooth operation.

3.3 Driving State-dependent Controller Corrections I

Figure 8:
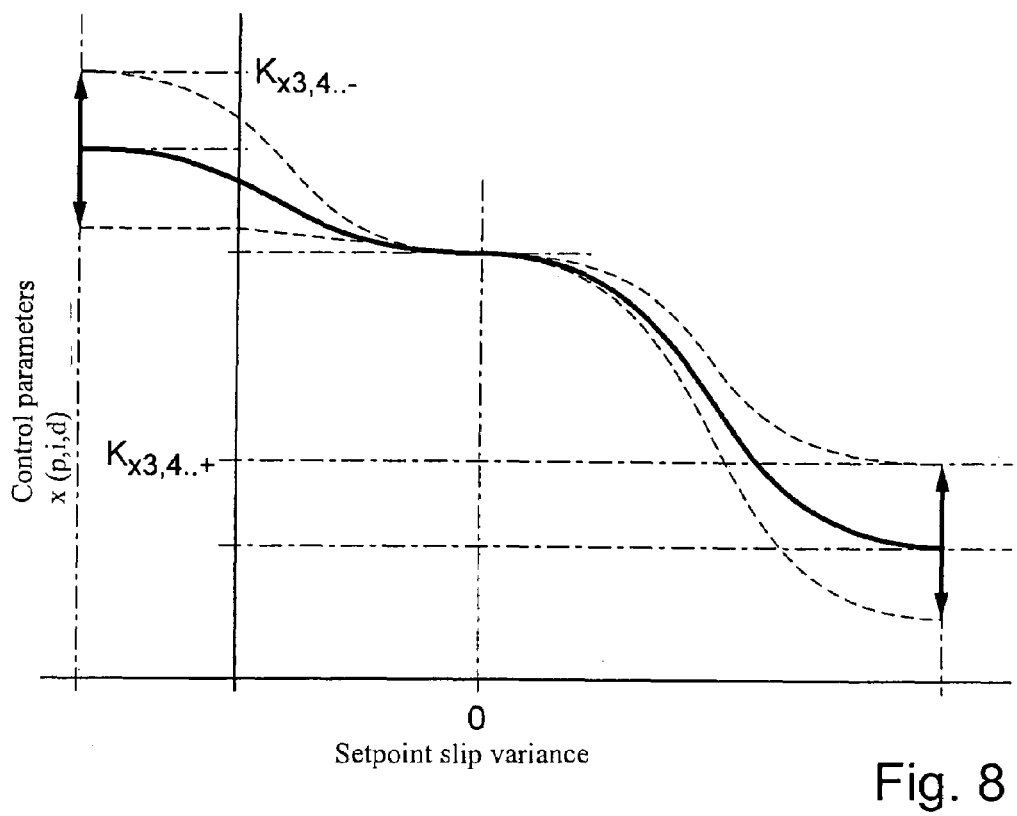
FIG. 8 shows a curve illustrating a characteristic curve correction of the controller.
Figure 9:
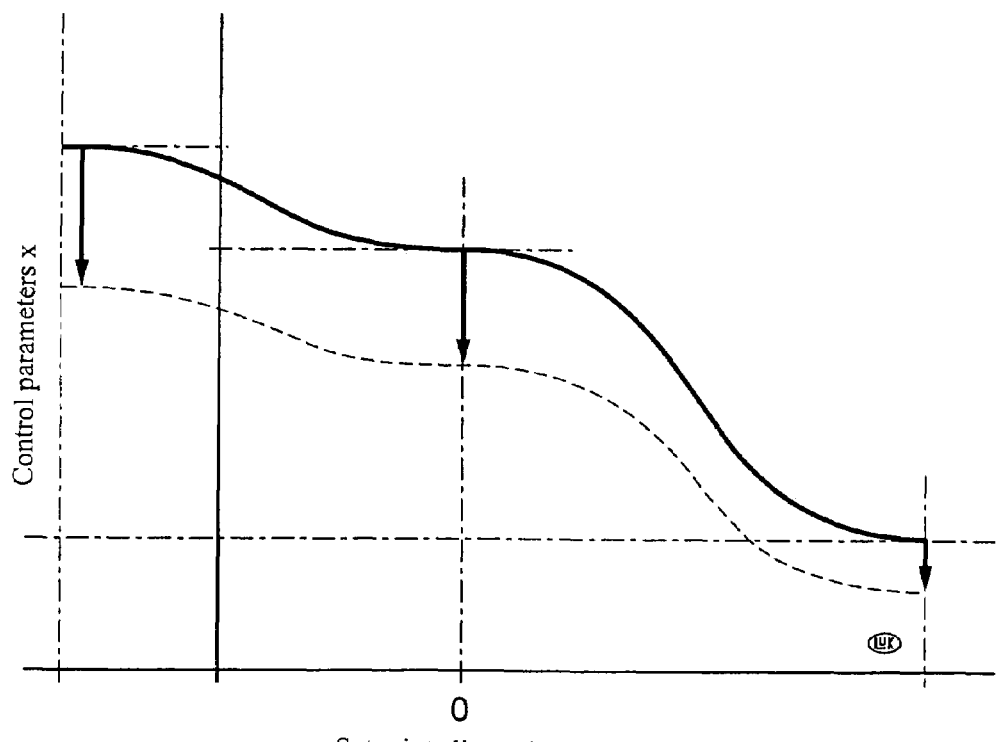
FIG. 9 shows a curve illustrating a proportional controller correction.

FIG. 8 shows how the controller characteristic curve of FIG. 7 is changed in the range of positive or negative setpoint slip variances depending on the driving state.

3.3.1 In the case of load shifting pulses during clutch engagement (tip-in) and clutch disengagement (back-out), the positive controller limit values are further reduced. The sum of the i-component is also set to zero (see R5 in FIG. 3). Tip-in is detected via the accelerator pedal 12 actuation gradient. Slip control may be used in the case of such load shifting pulses to dampen them. A higher slip speed may be allowed for this purpose so that a sticking state of the clutch is prevented and the torque transferable via the clutch is determined by the position of the clutch, i.e. as a function of the slip. Operational comfort may then be adjusted via the engagement speed of the clutch following an increase in the slip. At an abrupt load shift, the controller may be corrected correspondingly as a function of magnitude of the accelerator pedal change.

3.3.2 In the case of quickly decreasing slip variance, the positive controller limiting value is decreased (see R6 in FIG. 3).

3.3.3 In the case of extended negative slip variance, the negative controller limiting values are increased again in the normal case (R7 in FIG. 3). This increase is a function of the clutch torque since any error control is greater for high clutch torques than it is for low clutch torques. Furthermore, a reduction must occur for lower clutch torques to prevent instabilities (complete disengagement of the clutch).

3.3.4 During creeping or in analogous driving states, a creeping controller is activated (see R8 in FIG. 3). Because of the relatively high slip speed and low dynamics of the drive train, a gently synchronized, symmetrical controller is useful. The controller characteristic curve is completely reconfigured for this purpose. The characteristic curve attenuates the controller in the case of both positive and negative setpoint slip variance. In this way, the controller is extremely stable and might be activated to prevent controller vibrations.

3.4 Computation of Control Parameters

The three control parameters of the P, i, and D components are computed as a function of the slip variance on the basis of the corrected characteristic curve configuration (R9 in FIG. 3).

3.5 Driving State-dependent Controller Correction II

The remaining three parameters may be corrected again depending on the driving state.

3.5.1 Setpoint Slip-dependent Correction (R10)

Figure 10:
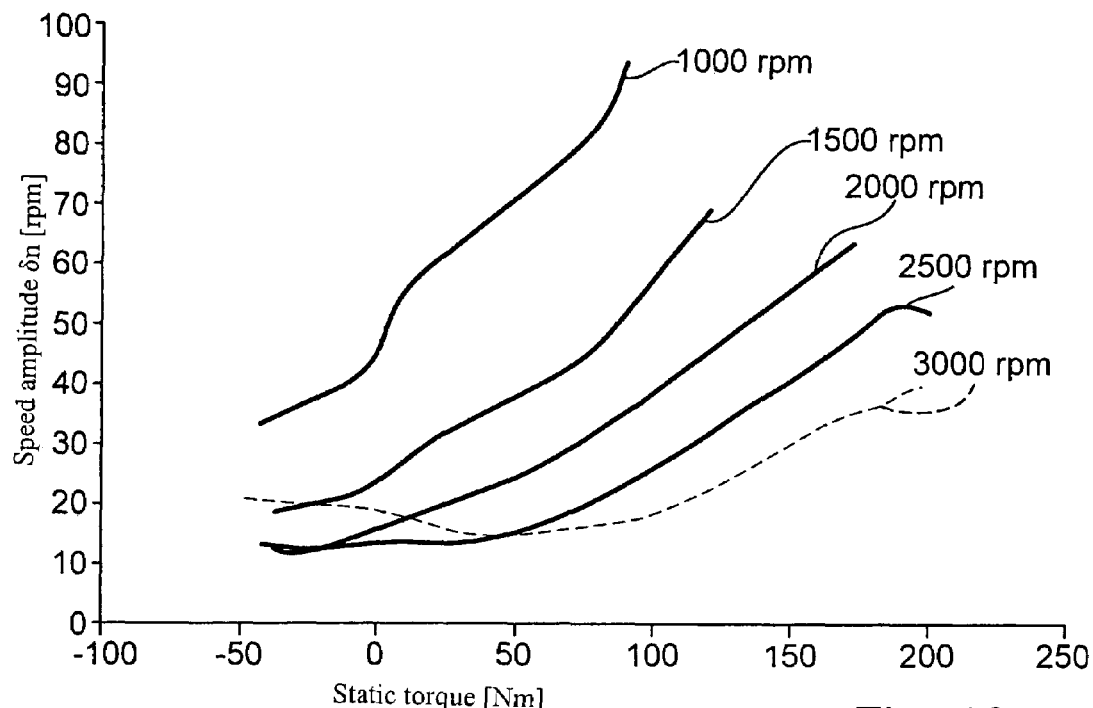
FIG. 10 shows rotational speed fluctuations as a function of the engine torque at various rotational speeds.
Figure 11:
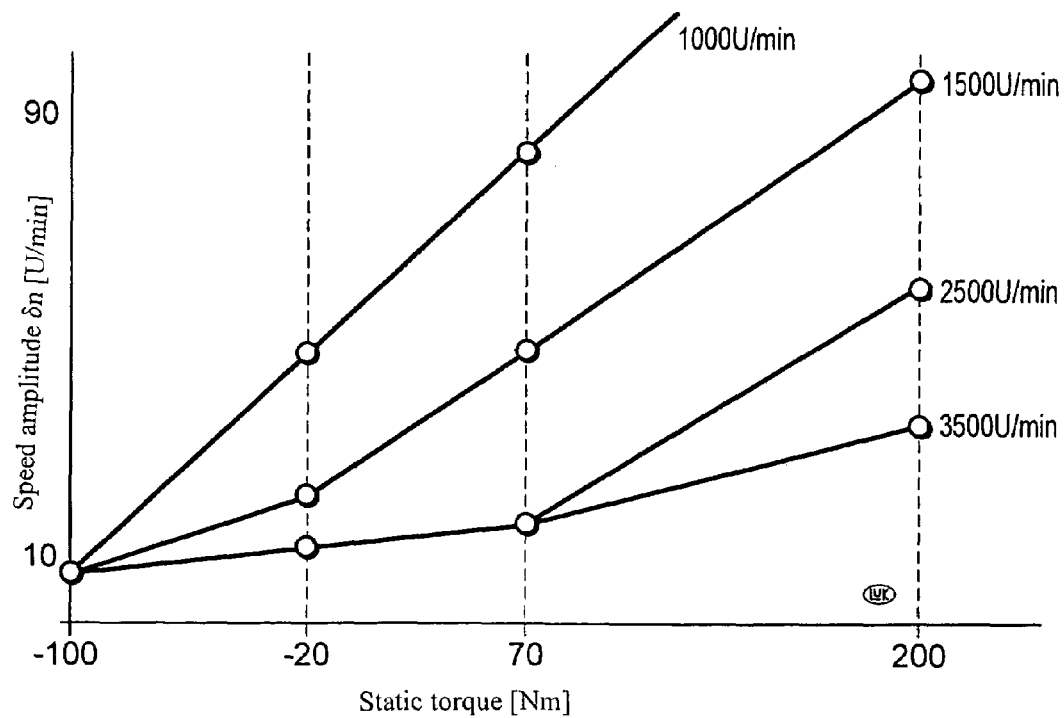
FIG. 11 shows a characteristic map derived from FIG. 11.

It has been found that the full slip range and the partial slip range are served better by different control parameters. Because of the retention phases in the partial slip range, a larger change in torque is necessary to effect the same setpoint slip change. FIG. 10 shows curves that indicate speed fluctuation δn for different rotational speeds depending on the engine torque. In this way, speed fluctuations may be stored in a characteristic map (FIG. 11) depending on the rotational speed and the engine torque. Such a characteristic map may then also be used for the precontrol (V4 in FIG. 5).

Within the scope of the present invention, partial slip is to be understood as a slip behavior in which time-dependent sticking and sliding states result at the clutch as a function of the rotational inconsistencies of the internal combustion engine which result as a function of the firing frequency or of the frequency of the combustion reactions in the individual cylinders on the crankshaft. The frequency of these temporally alternating states is dependent for example on the rotational speed of the crankshaft and the number of the cylinders. For reasons of wear and use, a desired slip that is as low as possible may be targeted in the slip control. The bottom limit may be set by a threshold value for the vibration isolation to be provided. Tests surprisingly showed that the engaged clutch may begin to slip during torque peaks of the internal combustion engine following the combustion reaction in a cylinder. In this slip state, the torque transferable by the clutch is limited. As soon as the rotational inconsistencies of the internal combustion engine result once again in a sticking state of the clutch, the torque entered into the drive train decreases since the internal combustion engine is supplying less torque at this instant. In this way, the average torque transferred via the clutch is less than the torque transferable via the clutch when the clutch is in partial slip. The average torque transferred by the clutch in partial slip is given for example by the relationship of slip to stick duration and the torque fluctuations resulting from the rotational inconsistencies of the internal combustion engine. This results in the following slip behavior:

From slip speed zero to the transition to full slip in which the rotational inconsistencies of the internal combustion engine no longer result in an alternating stick and slip state, the average torque transferred by the clutch increases constantly and achieves the torque transferred in full slip. If this behavior is viewed as the friction value behavior, this behavior may be viewed in the partial slip range as the behavior with positive friction value gradients since the average friction value decreases with the slip speed. Therefore, a negative friction value undesired in the physical sense may be compensated in the partial slip range. According to the inventive idea, this behavior may be advantageously used for slip regulation since the slip speed in the partial slip range is stabilized independently by the compensation of a possibly present negative friction value coefficient. When the slip increases, for example by an increase in the torque of the internal combustion engine, the torque transferred by the clutch also increases, thereby causing the slip to decrease again due to the positive friction value gradients. This stabilization may have a positive effect on the control response of a slip controller in the manner that it may be set stricter without causing unstable control conditions so that the control quality may be improved as a whole. As a result, extended sticking as well as clutch judder may be prevented.

Figure 12:
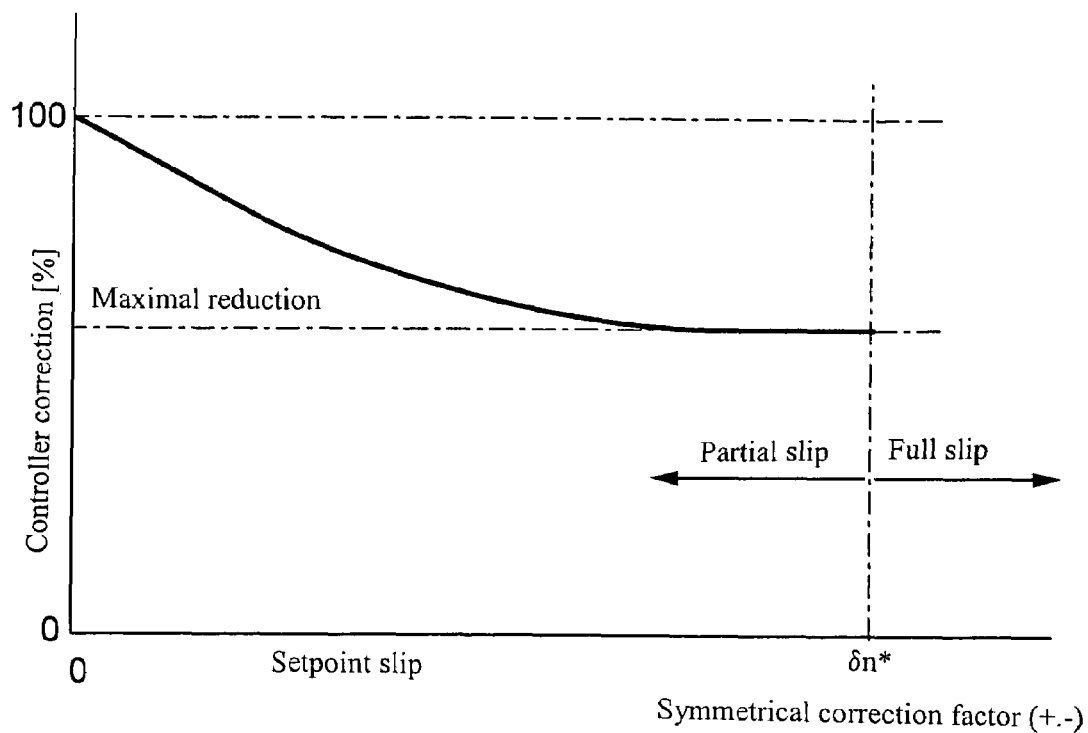
FIG. 12 shows a setpoint slip-dependent controller correction.

Under consideration of the asymmetry of the speed fluctuation with respect to the average rotational speed, the control parameters are reduced. A characteristic curve or a characteristic map that is parameterised by a lowering factor and the speed fluctuation is used for this purpose (see FIG. 12).

An optimal behavior during interferences is achieved in cooperation with the desired slip increase during interferences (S6 through S8 in FIG. 4) and the precontrol decrease (V3 in FIG. 5).

3.5.2 A change in the i-component is suppressed in the case of slip-dependently allowed periodic bleeding (adjustment of a hydraulic path) (see R8 in FIG. 3).

3.6 Controller Correction in the Case of Instabilities

Figure 14:
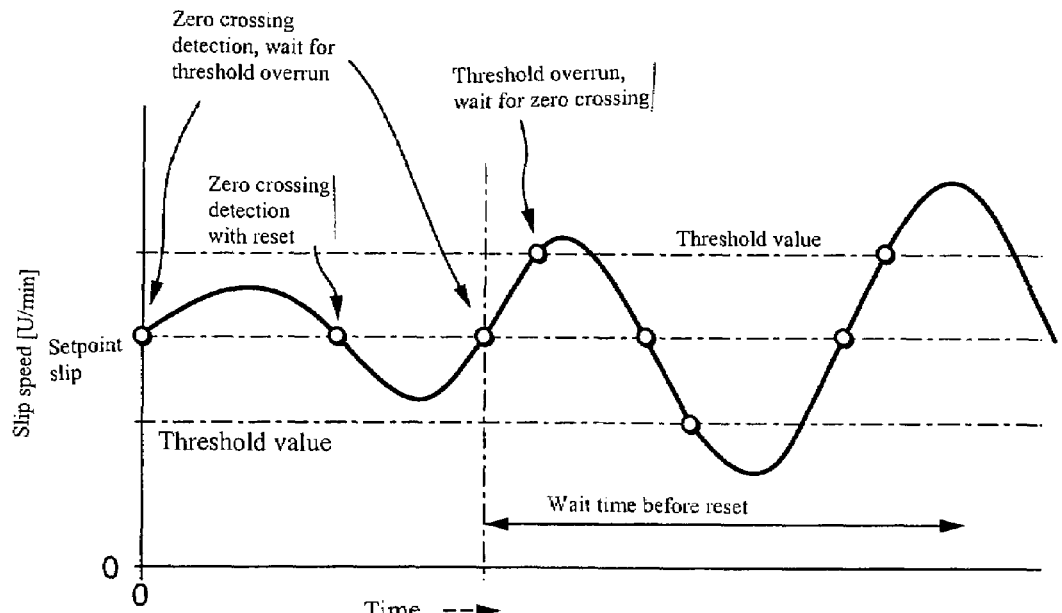
FIG. 14 shows a curve illustrating the detection of control vibrations.

Vibrations that may be attributed to controller instabilities are detected by the system because setpoint slip transitions and threshold value overruns of the slip variance take place in a predetermined sequence within a time interval (see FIG. 14). When such vibrations that are attributable to controller instabilities are detected, the controller level is quickly lowered and then slowly raised again. Alternatively, creeping controller R8 (FIG. 3) may be activated depending on the situation and subsequently deactivated again in the event of incorrect control conditions or state changes.

3.7 PIDT1 controller (R14)

Finally, the controller components are computed and added up taking into account the "old" i-component. In addition, torque changes in the precontrol that may be attributed to load shifting are taken into account in the i-component. The sum of the i-component is precontrolled or corrected depending on the change in torque.

Figure 15:
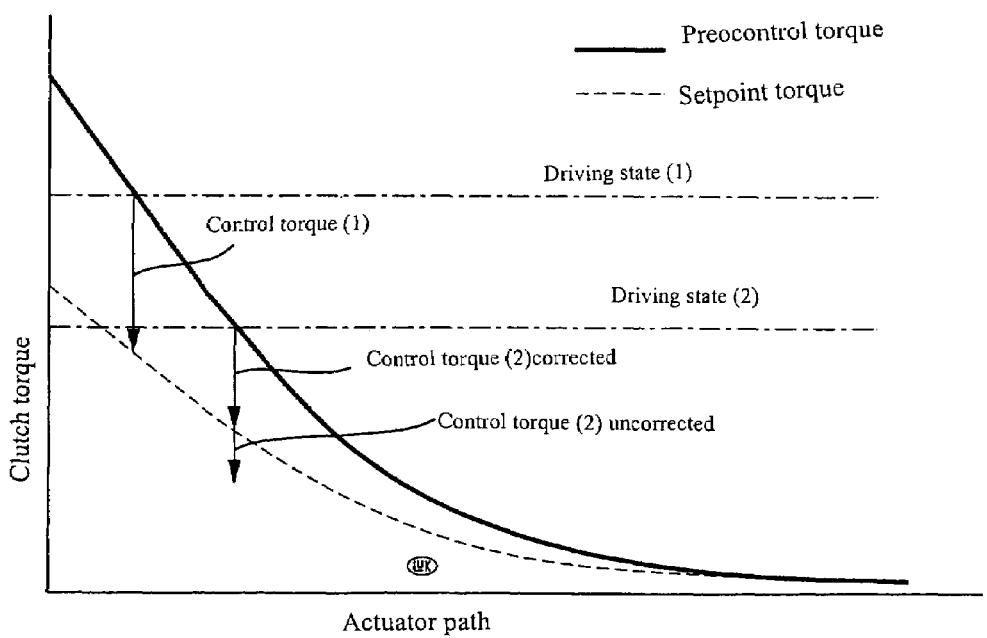
FIG. 15 shows curves illustrating a torque-dependent correction of the i-component of the controller.

FIG. 15 illustrates the reason for this measure.

The continuous curve shows engine torque-dependent precontrol torque Mvor, which is provided by adaptive precontrol unit 34 to computation unit 26. This precontrol torque is corrected by controller 38 by slip-dependent control torque Msr resulting in a value situated on the dashed setpoint torque curve. If driving state (1) changes suddenly to driving state (2), which is associated for example with another engine torque by a load shift, the integral component of controller 38 does not change instantaneously, which means that controller 38 would first intervene uncorrected with control torque 2, which corresponds to control torque 1. This would result in insufficient setpoint torque. This is compensated in that the i-component of the controller is corrected in accordance with change $\Delta M$ of engine torque M, according to the following equation:

$$\Delta M/M = \Delta i\text{-component}/i\text{-component}.$$

Thus in controller 38, to which the changed engine torque or the instantaneously changed pedal value or the changed position of load control element 4 (FIG. 1) is supplied via unit 36, the i-component is instantaneously corrected by the $\Delta i$-component with the result that the precontrol torque is reduced by corrected control torque 2, thereby directly yielding the setpoint torque. Thus, the controller is not required to compensate the incorrect control resulting during torque changes. The control variance resulting during load shifts may be minimized.

Naturally, the quick change of the i-component may also be taken into account in adaptive precontrol unit 34, so that the precontrol torque is changed additionally or exclusively in order to respond to quick changes.

3.8 Controller Output (R15)

The computed torque is transferred to input 24 as Msr (FIG. 1). During creeping, the controller torque and the creeping torque are added.

4. Functions of the Precontrol

For the reasons described in the previous chapter, optimization of the precontrol is essential for slip-controlled driving. The strategy is to keep the sum of the i-component as minimal as possible via an adaptive precontrol. This occurs in the first step via an adaptive precontrol. The precontrol may be optimized in this way regardless of the conventional friction value adaptation. The friction value may also be corrected in an optional second step.

4.1 Switching (V1, V2)

Switching was already explained in section 1.

4.2 Driving State-dependent Precontrol Correction

The two following functions change the precontrol depending on the driving state. The adaptive kme value remains unchanged in this context. The adaptive value describes the ideal precontrol torque at zero slip. The setpoint slip-dependent precontrol correction is required in order to be able to perform a precise kme adaptation in all operating points.

4.2.1 Kme Reduction (V3)

Tip-in provides the capability of slightly lowering the kme value to prevent subsequent sticking phases. The optimally adapted value is then reset via switching function V2.

4.2.2 Setpoint Slip-dependent Precontrol Correction (V4)

Figure 13:
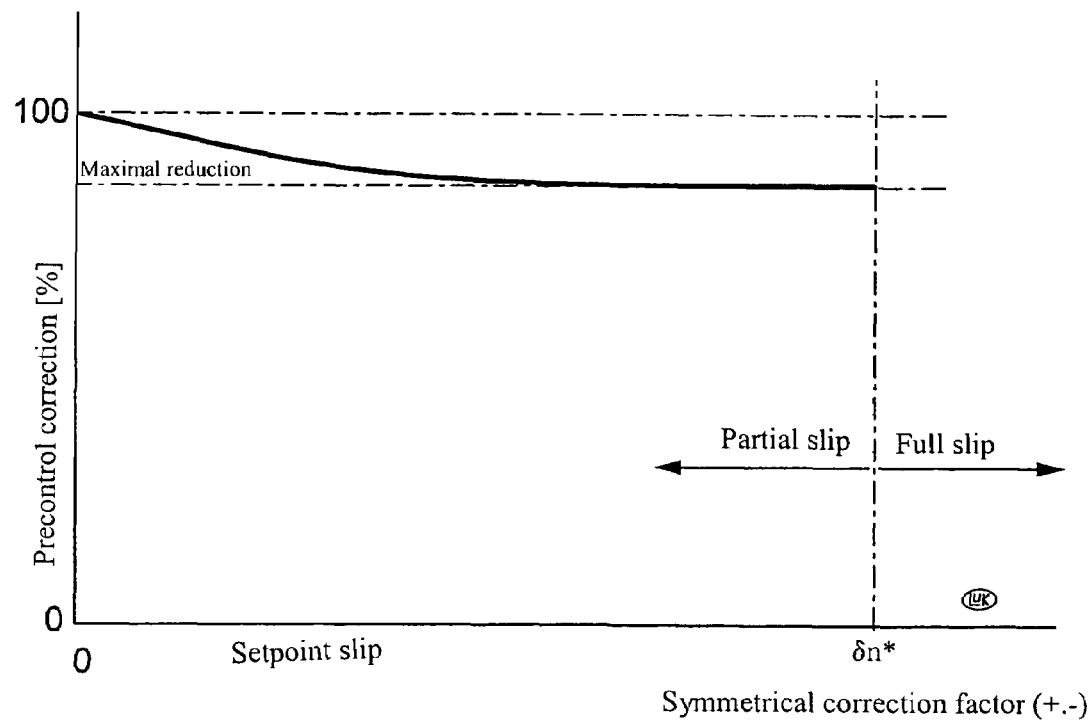
FIG. 13 shows a setpoint slip-dependent precontrol correction.

A correction of the precontrol torque in connection with the setpoint slip-dependent controller correction (V4) is advantageous. The computation is performed in parallel with the controller correction, but using its own reduction factor (see FIG. 13). The reduction factor may be determined experimentally using the kme adaptation and is approximately equal to 15% in full slip, for example. In partial slip, the clutch is accelerated differently with respect to the clutch disc as a function of the torsional vibrations of the engine. This is expressed in consecutive sticking and sliding states of the friction partners of the clutch and clutch disc. The correction optimizes the transitions during changes in the gas pedal position and during setpoint slip changes. State changes are improved in cooperation with R10 and R5 through R8. Moreover, the kme adaptation is rendered more precise in all operating points.

4.3 Kme Adaptation (V5)

The precontrol is adapted during slip operation under certain conditions. The identifier of an unfavorable precontrol is the i-component of controller 38. If the i-component of the controller is always positive or negative for a given time period, the kme value of the precontrol is changed (computed) such that the i-component equals zero on average. The adaptive kme value refers to a slip speed of zero. The slip-dependence of the precontrol is taken into account via function V4.

4.4 Friction Value Adaptation (V6)

The friction value of a clutch is derived in a known manner from the friction value characteristics of the friction partners, for example the friction linings of the clutch disc and the surfaces, for example metal surfaces, of the clutch compression plate and the pressure plate. The friction values are temperature-dependent so that an appropriate temperature correction may be performed using temperature models and/or temperature sensors. Additionally, the friction values are dependent on the compression force and the wear of the clutch linings and the friction partners thereof, with the result that corresponding corrections may be provided in the clutch control. In the new state, corresponding values and computational models may be provided that may be adjusted, i.e., adapted to the driving situation, operating time, and aging depending on the way the vehicle is operated.

The friction value is adapted for a defined variance of the adapted kme value from the basic value of the kme precontrol. For this purpose, the friction value is modified such that the kme basic value is reached again in the following adaptations (two-point control of the friction value). Of course, direct adaptation of the friction value without adaptation of the kme value is basically possible.

Slip control may advantageously provide a constant synchronization between engine torque and clutch torque from which a friction value adaptation may be derived. If the engine torque, which is corrected by the dynamic torque component (acceleration of the internal combustion engine) and the partial slip-dependent reduction of the torque, is set via the clutch precontrol, the i-component at the correct friction value is close to or equal to zero. If the i-component exceeds a predefined threshold value m, which may be determined by the driving state, a change results for the friction value that may be adapted in accordance with the magnitude of this change. The kme value may be corrected or adapted correspondingly. The friction value and kme value may be provided individually or in combination as a prefactor for the engine torque applied to the controller. The friction value may be adapted directly without or in combination with the adaptation of the kme value. The adaptation of the kme value is advantageously used primarily for short-term optimization of the slip controller while the adaptation of the friction value is used for longer-term optimization of the slip controller.

4.5 Time-dependent Precontrol

Figure 16:
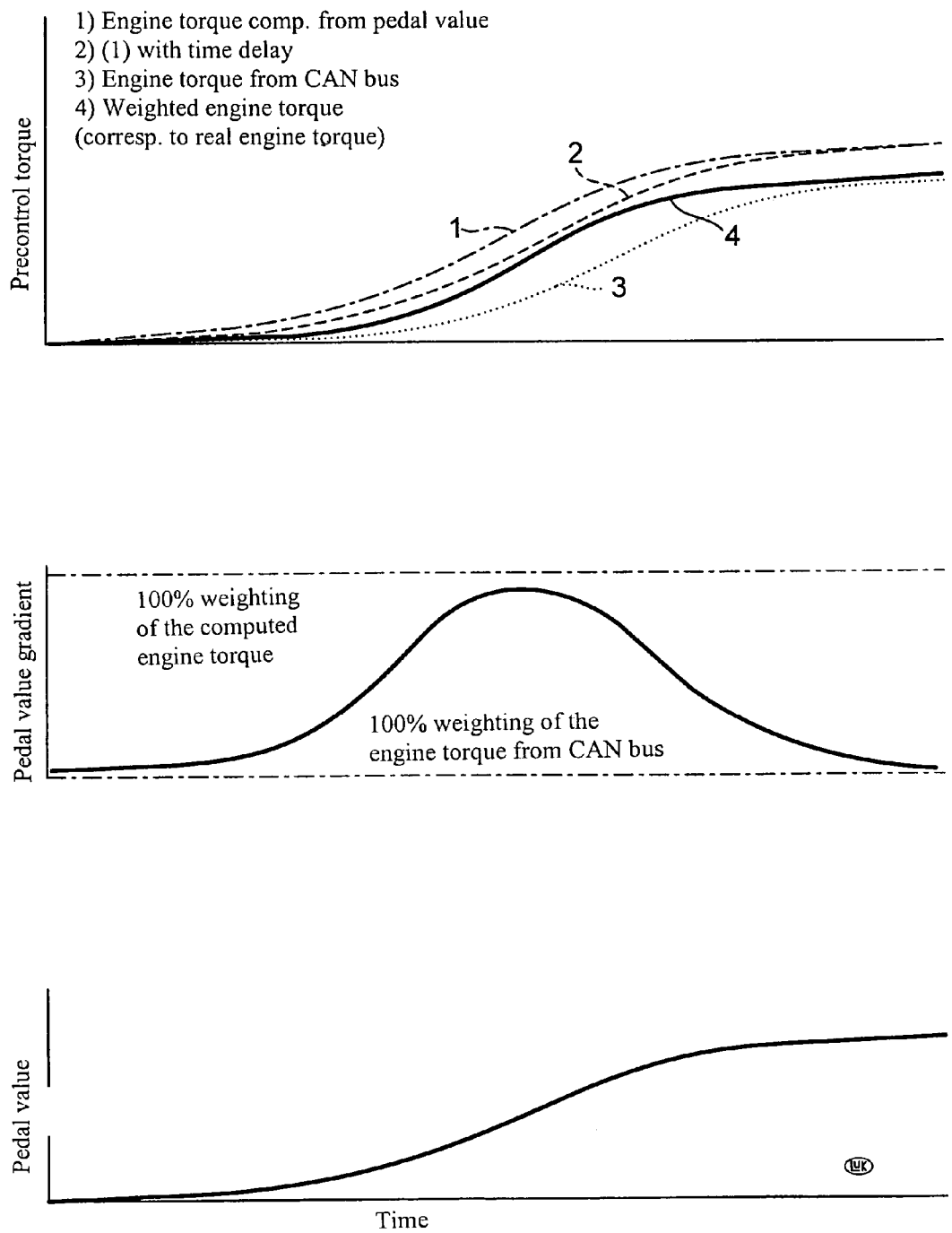
FIG. 16 shows curves illustrating the weighting of detected operating state variables for adapting the precontrol.

FIG. 16 explains how torque Mvor, which is computed in adaptive precontrol unit 34, is computed for increasing the control accuracy in particular during driving state changes, for example load shifting. As described, the precontrol torque is computed from the engine torque that is usually provided via the CAN bus for the electronic system. The engine torque may also be retrieved from a characteristic map in which it is stored as a function of the throttle valve angle or pedal value and the engine speed. The engine speed has the advantage that the expected engine torque is known before it is actually present at the clutch. The clutch torque may then be precontrolled with correct timing on the basis of the inertia of the positioning drive and the engine, via a time delay filter if required. As a rule, the engine torque from the CAN bus is available approximately 0.2 sec. later than the engine torque derived from the pedal value and the rotational speed; however, it is more precise.

In FIG. 16, the bottom curve shows the position of the gas pedal or a load control element of the engine as a function of time. The middle curve provides the time-dependent derivation of the pedal value position. The dashed lines in the middle representation indicate that only the engine torque derived from the pedal value and the rotational speed are taken into account for large pedal value gradients and that only the engine torque derived from the CAN bus is taken into account for small pedal value gradients.

The top curves indicate the various options for which engine torque is taken into account in the computation of the precontrolled clutch torque. Curve 1 shows the engine torque computed exclusively from the pedal value and the rotational speed. Curve 2 shows curve 1 with consideration of a time delay. Curve 3 shows the engine torque derived from the CAN bus, and curve 4 shows the weighted engine torque as it is taken into account for the actual precontrol.

4.6 Precontrol Output

The precontrol is implemented by restricting the kme value. The product of the previously determined kme value and the instantaneous engine torque may provide the precontrol torque for this purpose. As described in the preceding, the ineffective torque components, for example the dynamic engine torque, are eliminated in advance in this context.

5. Setpoint Slip Determination

The purpose of setpoint slip determination is to prevent transmission rattle and vehicle hum. The setpoint slip may be determined in unit 40 in accordance with the operating parameters of the drive train. A further option is for example to connect a sensor for detecting interference noises, such as transmission rattle, vehicle humming, or the like, to setpoint slip computation unit 40 and to increase setpoint slip Δns for as long as the interference noises detected are greater than a predetermined value and to reduce desired slip Δns for as long as the interference noises are lower than a predetermined value. The sensor for detecting the interference noises may be an acoustic sensor or for example a wheel speed sensor of the anti-lock system for detecting speed fluctuations in at least one drive wheel. In this way, the setpoint slip speed may be reduced to a minimum, so that increased fuel consumption and wear due to slip may be minimized.

5.1. Slip Characteristic Map

The setpoint slip is computed from two characteristic maps. The first characteristic map describes the setpoint slip specification under full load (S1 in FIG. 4) and includes the switching point for switching slip control switch 20 to conventional control at high rotational speeds. The second characteristic map is used to reduce the setpoint slip in the partial load range (S2).

5.2 Setpoint Slip Correction Depending on Driving State

The setpoint slip is also determined in special driving situations independently of the characteristic map.

5.2.1 Setpoint Slip Value for Creeping (S3)

A separate, proportionally high setpoint slip is specified during creeping.

5.2.2 Setpoint Slip During Bleeding (S4)

The setpoint slip is set to zero during a bleeding procedure (resetting of a hydraulic path) so that the position of the fully engaged clutch may be set.

5.3 Setpoint Slip Incrementation

A relatively slow setpoint slip incrementation (S8) prevents jumps in the control variance or load changes, thereby additionally stabilizing the controller. After interferences (S6 through S8), the setpoint slip is reduced again via incrementation.

5.4 Setpoint Slip Increase

The setpoint slip is increased in a specific manner during interferences such as gear change, tip-in, zero transition, etc. This prevents sticking phases and the control variance at negative control variance is increased. The slip is quickly reduced again to the original setpoint dimension by setpoint slip decrementation (S5).

The setpoint slip is increased during a gear change (S6).
The setpoint slip is increased in zero transition (S7).
The setpoint slip is also increased during tip-in.

5.5 Setpoint Slip Output

The setpoint slip value is output to controller 38.

6. General Strategy for Optimizing Slip Control

FIG. 15 illustrates a slip control problem described previously. Incorrect control of the clutch torque occurs as a result of changes in the clutch torque if the i-component is not equal to zero. This aspect is counteracted by three measures:

The relatively slow kme adaptation in precontrol unit 34 ensures that the i-component of the controller is zero on average. This results in the best possible precontrol. Among other things, imprecise information in the CAN bus results in the i-component not being approximately zero in all operating states.

The even slower friction value adaptation ensures that a setpoint kme value is maintained at which switching gears and starting actions are optimally adjusted. This friction value adaptation serves as a useful supplement to the conventional friction value adaptation.

The torque-dependent correction integrated in the controller ensures immediate consideration of the above-described effect. It is important for this purpose for the engine torque signal to be precise.

7. Driving State-dependent Strategies and Controller Adjustment

Slip operation places the following important demands on the controller:

Fast, precise, and stable adjustment of the setpoint slip

It is advantageous to quickly compensate inaccuracies in the precontrol via a "firm" synchronization of the controller. In this context, the i-component of PIDT1 controller 38 (R14) assures rapid correction even for small control variances. Due to the inertia of the precontrol and the controller, the i-component must be reduced during load shifts in order to prevent over-controlling. At the same time, the controller is stabilized by a slip-dependent configuration of the controller components (R4, R10). In addition, there is the option of allowing the controller to function in the event of instabilities at the limit of controller stability via controller correction (R12, R13).

7.2 Prevention of Sticking Phases During Load Shifts

The cooperation of various measures for control and regulation prevents sticking phases following changes in the loading state or engine torque. This is achieved by:

Characteristic curve-dependent increase of the controller parameters in the event of a negative slip variance (R4), Further increase of the i-component following a time limit (R17), Reduction of the i-component in the event of a positive slip variance (R4), Further reduction of the i-component during tip-in (R5), Elimination of the i-component during rapid setpoint slip decrease (R6), Brief setpoint slip increase during interferences such as gear change (S6), zero transition (S7), tip-in (S8), Setpoint slip-dependent reduction of the kme value (V4), and Additional reduction of the clutch torque during tip-in (V3).

As a result of these measures, the setpoint slip speed is achieved from "outside" to the greatest extent possible (positive control variance). For this, it is necessary to disengage the clutch slightly during interferences. Together with the setpoint slip control, the controller ensures fast and precise engagement of the clutch. This strategy for small setpoint slip specifications due to only small possible negative control variances has the following advantages:

Prevention of sticking phases by using the positive control variances occurring during load shifts;

Greater stability of the controller due to a lower degree of control firmness at negative setpoint slip variance;

No over-control (disengaging the clutch after sticking phases), and

Quickly reading the setpoint slip speed.

7.3 Load Shift Synchronization

The slip control provides the option of adjusting load shifts almost at will. Functions R4 and R5 (FIG. 3) are mainly used for this purpose:

Load shifting is synchronized via the P and D components of the controller in the second step at positive slip variance (R4).

During tip-in, there is the option of separate synchronization, also via the P and D components of the controller (R5).

7.4 Improvement in Transitions (Switches)

Switching between the conventional and the slip strategy must be executed without torque jump. The transitions are effected via functions R1, R2, V1, and V2, a driving state-dependent controller initialization, and intervention in the creeping function (see also chapter 1). General activation of the slip control is achieved by setting a state flag.

The patent claims filed with the application are formulation proposals without prejudice of the achievement of broader patent protection. The applicant reserves the right to claim additional feature combinations previously only disclosed in the description and/or the drawing.

The back-references used in the subclaims indicate further refinements of the object of the main claim by the features of the particular subclaim. They are not to be understood as a waiver of obtaining an independent claim for the combination of features of the back-referenced subclaims.

Because the objects of the subclaims may form separate independent inventions with respect to the related art on the priority date, the applicant reserves the right to make them the object of independent claims or division clarifications. They may furthermore also contain independent inventions having a design that is independent of the objects of the aforementioned subclaims.

The exemplary embodiments are not to be understood as limitations of the present invention. Rather, numerous modifications and variants are possible within the present disclosure, in particular variants, elements, and combinations and/or materials that are obvious to those skilled in the art regarding the achievement of the object of the present invention, for example, by combination or modification of individual features or elements or method steps described in the general description and embodiments as well as in the claims and contained in the drawing, resulting in a new object or new method steps or method step sequences via combinable features, including those concerning manufacturing, testing, and work methods.

What is claimed is:

1. A system for controlling an automated friction clutch disposed between an engine and a transmission of a motor vehicle, comprising:

an actuator configured to set the clutch to a position defined by a position signal;

a clutch torque computation device configured to compute an engine torque-dependent component of a setpoint clutch torque and a clutch slip-dependent component of the setpoint clutch torque from an engine torque and at least one operating state variable of the drive train of the vehicle;

a position signal computation device configured to determine the position signal supplied to the actuator from the engine-torque component and the clutch slip-dependent component of the setpoint clutch torque and a stored assignment between the setpoint clutch torque and the position signal;

an adaptive precontrol unit;

a setpoint slip computational unit configured to compute a setpoint slip, a controller configured to receive a signal corresponding to an actual slip and a signal corresponding to the setpoint slip from the setpoint slip computational unit; and a slip-control switch disposed between the clutch torque computation device and the position signal computation device, wherein, in a slip-control state, the slip-control switch is configured to separate a direct connection between the clutch torque computation device and the position signal computation device, to connect a signal path containing the engine-torque component of the clutch torque from the adaptive precontrol unit to a first input of the position signal computational unit, and to connect a signal path containing the slip-dependent component of the clutch torque from the controller to a second input of the position signal computation unit.

2. The system as recited in claim 1, wherein the drive train includes the engine, the clutch, and the transmission of the vehicle.

3. A system for controlling an automated friction clutch situated between an engine and a transmission of a motor vehicle, comprising:

an actuator configured to set the clutch to a position defined by a position signal;

a clutch torque computation device configured to compute an engine torque-dependent component of a setpoint clutch and a clutch slip-dependent component of the setpoint clutch torque from an engine torque and at least one operating state variable of the drive train of the vehicle;

an adaptive precontrol unit receiving a first signal corresponding to the engine torque-dependent component from the clutch torque computation device;

a controller configuration unit receiving a second signal corresponding to the clutch slip-dependent component from the clutch torque computational device and configured to detect at least a second operating state variable of the drive train;

setpoint slip computation device configured to compute a setpoint slip;

a controller receiving a third signal from the controller configuration unit, fourth signal corresponding to an actual slip, and a fifth signal corresponding to the setpoint slip from the setpoint slip computation device;

a position signal computation device receiving a sixth signal from the adaptive precontrol unit at an engine torque-dependent input and receiving a seventh signal from the controller at a clutch slip-dependent input, the position signal computation device configured to determine the position signal using the sixth and seventh signals and a stored assignment between the setpoint clutch torque and the position signal.

4. The system as recited in claim 3, wherein the controller is a PID controller and the controller provides an i-component to the adaptive precontrol unit, and wherein the adaptive precontrol unit adapts the engine torque-dependent component of the clutch torque in accordance with the i-component and at least a third operating state variable of the drive train.

5. The system as recited in claim 4, wherein the controller is a PIDT1 controller.

6. The system as recited in claim 1, wherein the slip control switch is switched to the slip control state on the basis of predetermined operating state variables.

7. The system as recited in claim 3, wherein functions of the slip control are determined on the basis of the characteristic curve of a Gaussian error integral.

8. The system as recited in claim 3, further comprising a controller parameter characteristic curve including two characteristic curve branches, the branches being steadily contingent with one another given a slip variance of zero and each branch running according to a Gaussian error integral and have higher values in a negative slip variance range than in a positive slip variance range.

9. The system as recited in claim 8, wherein the controller parameter characteristic curve includes limiting values that are increased or decreased depending on a driving state and wherein the controller parameters are recomputed following activation of the slip control state.

10. The system as recited in claim 8, wherein the wherein different control parameters are used in a full slip range as in a partial slip range.

11. The system as recited in claim 3, wherein the adaptive precontrol unit changes the engine torque-dependent component of the clutch torque as a function of at least one of an operating state variable of the drive train and the setpoint slip.

12. The system as recited in claim 3, wherein the setpoint slip computation device stores setpoint slip as a function of an engine torque and an engine speed and is decreased in response to a decreasing engine torque.

13. The system as recited in claim 3, further comprising a sensor that detects a slip-dependent interference variable, and wherein the setpoint slip computing device is connected to the sensor and determines the setpoint slip in such a way that the interference variable remains below a threshold value.

14. The system as recited in claim 12, wherein the setpoint slip computation device changes the setpoint slip in a predetermined manner during predetermined driving states.

* * * * *